United States Patent
Matthews et al.

(10) Patent No.: US 9,222,427 B2
(45) Date of Patent: Dec. 29, 2015

(54) INTAKE PORT PRESSURE PREDICTION FOR CYLINDER ACTIVATION AND DEACTIVATION CONTROL SYSTEMS

(71) Applicant: GM Global Technology Operations LLC, Detroit, MI (US)

(72) Inventors: Gregory P. Matthews, West Bloomfield, MI (US); Zhiping Steven Liu, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 279 days.

(21) Appl. No.: 13/798,536

(22) Filed: Mar. 13, 2013

(65) Prior Publication Data

US 2014/0069376 A1  Mar. 13, 2014

Related U.S. Application Data

(60) Provisional application No. 61/698,983, filed on Sep. 10, 2012.

(51) Int. Cl.
| | | |
|---|---|---|
| F02D 41/00 | (2006.01) | |
| F02D 41/18 | (2006.01) | |
| F02D 13/02 | (2006.01) | |

(Continued)

(52) U.S. Cl.
CPC ........ *F02D 41/0087* (2013.01); *F02D 13/0219* (2013.01); *F02D 13/06* (2013.01); *F02D 17/02* (2013.01); *F02D 41/18* (2013.01); *F02D 2041/001* (2013.01); *F02D 2041/0012* (2013.01); *F02D 2200/0402* (2013.01);

(Continued)

(58) Field of Classification Search
CPC ..... F02D 41/0087; F02D 41/00; F02D 17/02; F02D 13/06; F01L 2013/001
USPC .......................................................... 701/111
See application file for complete search history.

(56) References Cited

U.S. PATENT DOCUMENTS

| | | |
|---|---|---|
| 4,377,997 A | 3/1983 | Staerzl |
| 4,509,488 A | 4/1985 | Forster et al. |

(Continued)

FOREIGN PATENT DOCUMENTS

| | | |
|---|---|---|
| CN | 101353992 A | 1/2009 |
| CN | 102454493 A | 5/2012 |

OTHER PUBLICATIONS

U.S. Appl. No. 14/211,389, Liu et al.

(Continued)

*Primary Examiner* — Stephen K Cronin
*Assistant Examiner* — Xiao Mo

(57) ABSTRACT

A system includes a parameter module that determines at least one of a position of a throttle and a load of an engine. A cylinder status module generates a status signal indicating an activation status of each cylinder of the engine. The cylinder status module determines whether one or more of the cylinders are activated. A first pressure prediction module, when all of the cylinders are activated, predicts first intake port pressures for the cylinders of the engine according to a first model and based on the at least one of the position of the throttle and the engine load. A second pressure prediction module, when one or more of the cylinders is deactivated, predicts second intake port pressures for the deactivated cylinders according to a second model and based on the status signal and the at least one of the position of the throttle and the engine load.

20 Claims, 4 Drawing Sheets

(51) Int. Cl.
*F02D 13/06* (2006.01)
*F02D 17/02* (2006.01)

(52) U.S. Cl.
CPC . *F02D2200/0404* (2013.01); *F02D 2200/0408* (2013.01); *F02D 2250/18* (2013.01)

(56) References Cited

U.S. PATENT DOCUMENTS

| | | | |
|---|---|---|---|
| 4,535,744 | A | 8/1985 | Matsumura |
| 5,042,444 | A | 8/1991 | Hayes et al. |
| 5,094,213 | A | 3/1992 | Dudek et al. |
| 5,226,513 | A | 7/1993 | Shibayama |
| 5,357,932 | A | 10/1994 | Clinton et al. |
| 5,374,224 | A | 12/1994 | Huffmaster et al. |
| 5,377,631 | A | 1/1995 | Schechter |
| 5,423,208 | A | 6/1995 | Dudek et al. |
| 5,465,617 | A | 11/1995 | Dudek et al. |
| 5,669,354 | A | 9/1997 | Morris |
| 5,884,605 | A | 3/1999 | Nagaishi et al. |
| 5,909,720 | A | 6/1999 | Yamaoka et al. |
| 6,360,724 | B1 | 3/2002 | Suhre et al. |
| 6,760,656 | B2 | 7/2004 | Matthews et al. |
| 6,978,204 | B2 | 12/2005 | Surnilla et al. |
| 7,066,121 | B2 | 6/2006 | Michelini et al. |
| 7,069,718 | B2 | 7/2006 | Surnilla et al. |
| 7,100,720 | B2 | 9/2006 | Ishikawa |
| 7,140,355 | B2 | 11/2006 | Michelini et al. |
| 7,174,879 | B1 | 2/2007 | Chol et al. |
| 7,292,231 | B2 | 11/2007 | Kodama et al. |
| 7,292,931 | B2 | 11/2007 | Davis et al. |
| 7,319,929 | B1 | 1/2008 | Davis et al. |
| 7,363,111 | B2 | 4/2008 | Vian et al. |
| 7,464,676 | B2 | 12/2008 | Wiggins et al. |
| 7,497,074 | B2 | 3/2009 | Surnilla et al. |
| 7,499,791 | B2 | 3/2009 | You et al. |
| 7,577,511 | B1 | 8/2009 | Tripathi et al. |
| 7,685,976 | B2 | 3/2010 | Marriott |
| 7,785,230 | B2 | 8/2010 | Gibson et al. |
| 7,849,835 | B2 | 12/2010 | Tripathi et al. |
| 7,886,715 | B2 | 2/2011 | Tripathi et al. |
| 7,930,087 | B2 | 4/2011 | Gibson et al. |
| 7,954,474 | B2 | 6/2011 | Tripathi et al. |
| 8,099,224 | B2 | 1/2012 | Tripathi et al. |
| 8,131,445 | B2 | 3/2012 | Tripathi et al. |
| 8,131,447 | B2 | 3/2012 | Tripathi et al. |
| 8,146,565 | B2 | 4/2012 | Leone et al. |
| 8,272,367 | B2 | 9/2012 | Shikama et al. |
| 8,616,181 | B2 | 12/2013 | Sahandiesfanjani et al. |
| 8,646,430 | B2 | 2/2014 | Kinoshita |
| 8,646,435 | B2 | 2/2014 | Dibble et al. |
| 8,701,628 | B2 | 4/2014 | Tripathi et al. |
| 8,833,058 | B2 | 9/2014 | Ervin et al. |
| 8,833,345 | B2 | 9/2014 | Pochner et al. |
| 2003/0131820 | A1 | 7/2003 | McKay et al. |
| 2003/0172900 | A1 | 9/2003 | Boyer et al. |
| 2005/0016492 | A1 | 1/2005 | Matthews |
| 2005/0131618 | A1 | 6/2005 | Megli et al. |
| 2005/0197761 | A1 | 9/2005 | Bidner et al. |
| 2005/0204726 | A1 | 9/2005 | Lewis |
| 2005/0204727 | A1 | 9/2005 | Lewis et al. |
| 2005/0205028 | A1 | 9/2005 | Lewis et al. |
| 2005/0205045 | A1 | 9/2005 | Michelini et al. |
| 2005/0205060 | A1 | 9/2005 | Michelini et al. |
| 2005/0205063 | A1 | 9/2005 | Kolmanovsky et al. |
| 2005/0205069 | A1 | 9/2005 | Lewis et al. |
| 2005/0205074 | A1 | 9/2005 | Gibson et al. |
| 2005/0235743 | A1 | 10/2005 | Stempnik et al. |
| 2006/0107919 | A1 | 5/2006 | Nishi et al. |
| 2007/0042861 | A1 | 2/2007 | Takaoka et al. |
| 2007/0107692 | A1 | 5/2007 | Kuo et al. |
| 2007/0131196 | A1 | 6/2007 | Gibson et al. |
| 2007/0235005 | A1 | 10/2007 | Lewis |
| 2008/0066699 | A1 | 3/2008 | Michelini et al. |
| 2008/0154468 | A1 | 6/2008 | Berger et al. |
| 2008/0288146 | A1 | 11/2008 | Beechie et al. |
| 2009/0030594 | A1 | 1/2009 | You et al. |
| 2009/0042458 | A1 | 2/2009 | Kinoshita |
| 2009/0177371 | A1 | 7/2009 | Reinke |
| 2009/0248277 | A1 | 10/2009 | Shinagawa et al. |
| 2009/0248278 | A1 | 10/2009 | Nakasaka |
| 2010/0006065 | A1 | 1/2010 | Tripathi et al. |
| 2010/0010724 | A1 | 1/2010 | Tripathi et al. |
| 2010/0059004 | A1 | 3/2010 | Gill |
| 2010/0100299 | A1 | 4/2010 | Tripathi et al. |
| 2010/0192925 | A1 | 8/2010 | Sadakane |
| 2010/0211299 | A1 | 8/2010 | Lewis et al. |
| 2011/0030657 | A1 | 2/2011 | Tripathi et al. |
| 2011/0048372 | A1 | 3/2011 | Dibble et al. |
| 2011/0144883 | A1 | 6/2011 | Rollinger et al. |
| 2011/0208405 | A1 | 8/2011 | Tripathi et al. |
| 2011/0213540 | A1 | 9/2011 | Tripathi et al. |
| 2011/0213541 | A1 | 9/2011 | Tripathi et al. |
| 2011/0251773 | A1 | 10/2011 | Sahandiesfanjani et al. |
| 2012/0055444 | A1 | 3/2012 | Tobergte et al. |
| 2012/0109495 | A1 | 5/2012 | Tripathi et al. |
| 2012/0116647 | A1 | 5/2012 | Pochner et al. |
| 2012/0143471 | A1 | 6/2012 | Tripathi et al. |
| 2012/0221217 | A1 | 8/2012 | Sujan et al. |
| 2012/0285161 | A1 | 11/2012 | Kerns et al. |
| 2013/0092128 | A1 | 4/2013 | Pirjaberi et al. |
| 2014/0090624 | A1 | 4/2014 | Verner |

OTHER PUBLICATIONS

U.S. Appl. 14/734,619, filed Jun. 9, 2015, Matthews.
U.S. Appl. No. 13/798,351, filed Mar. 13, 2013, Rayl.
U.S. Appl. No. 13/798,384, filed Mar. 13, 2013, Burtch.
U.S. Appl. No. 13/798,400, filed Mar. 13, 2013, Phillips.
U.S. Appl. No. 13/798,435, filed Mar. 13, 2013, Matthews.
U.S. Appl. No. 13/798,451, filed Mar. 13, 2013, Rayl.
U.S. Appl. No. 13/798,471, filed Mar. 13, 2013, Matthews et al.
U.S. Appl. No. 13/798,518, filed Mar. 13, 2013, Beikmann.
U.S. Appl. No. 13/798,540, filed Mar. 13, 2013, Brennan et al.
U.S. Appl. No. 13/798,574, filed Mar. 13, 2013, Verner.
U.S. Appl. No. 13/798,586, filed Mar. 13, 2013, Rayl et al.
U.S. Appl. No. 13/798,590, filed Mar. 13, 2013, Brennan et al.
U.S. Appl. No. 13/798,624, filed Mar. 13, 2013, Brennan et al.
U.S. Appl. No. 13/798,701, filed Mar. 13, 2013, Burleigh et al.
U.S. Appl. No. 13/798,737, filed Mar. 13, 2013, Beikmann.
U.S. Appl. No. 13/798,775, filed Mar. 13, 2013, Phillips.
U.S. Appl. No. 13/799,116, filed Mar. 13, 2013, Brennan.
U.S. Appl. No. 13/799,129, filed Mar. 13, 2013, Beikmann.
U.S. Appl. No. 13/799,181, filed Mar. 13, 2013, Beikmann.
U.S. Appl. No. 14/300,469, filed Jun. 10, 2014, Li et al.
U.S. Appl. No. 14/310,063, filed Jun. 20, 2014, Wagh et al.
U.S. Appl. No. 14/449,726, filed Aug. 1, 2014, Hayman et al.
U.S. Appl. No. 14/548,501, filed Nov. 20, 2014, Beikmann et al.
U.S. Appl. No. 61/952,737, filed Mar. 13, 2014, Shost et al.

INTAKE PORT PRESSURE PREDICTION FOR CYLINDER ACTIVATION AND DEACTIVATION CONTROL SYSTEMS

CROSS-REFERENCE TO RELATED APPLICATIONS

This application claims the benefit of U.S. Provisional Application No. 61/698,983, filed on Sep. 10, 2012. The disclosure of the above application is incorporated herein by reference in its entirety.

This application is related to U.S. patent application Ser. No. 13/798,351 filed on Mar. 13, 2013, Ser. No. 13/798,586 filed on Mar. 13, 2013, Ser. No. 13/798,590 filed on Mar. 13, 2013, Ser. No. 13/798,435 filed on Mar. 13, 2013, Ser. No. 13/798,471 filed on Mar. 13, 2013, Ser. No. 13/798,737 filed on Mar. 13, 2013, Ser. No. 13/798,701 filed on Mar. 13, 2013, Ser. No. 13/798,518 filed on Mar. 13, 2013, Ser. No. 13/799, 129 filed on Mar. 13, 2013, Ser. No. 13/798,540 filed on Mar. 13, 2013, Ser. No. 13/798,574 filed on Mar. 13, 2013, Ser. No. 13/799,181 filed on Mar. 13, 2013, Ser. No. 13/799,116 filed on Mar. 13, 2013, Ser. No. 13/798,624 filed on Mar. 13, 2013, Ser. No. 13/798,384 filed on Mar. 13, 2013, Ser. No. 13/798, 775 filed on Mar. 13, 2013, and Ser. No. 13/798,400 filed on Mar. 13, 2013. The entire disclosures of the above applications are incorporated herein by reference.

FIELD

The present disclosure relates to internal combustion engines and more specifically to cylinder activation and deactivation control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An internal combustion engine (ICE) combusts mixtures of air and fuel (air/fuel mixtures) within cylinders to actuate pistons and produce drive torque. Air flow and fuel injection of the ICE may be controlled respectively via a throttle and a fuel injection system. Position adjustment of the throttle adjusts air flow into the ICE. The fuel injection system may be used to adjust a rate that fuel is injected into the cylinders to provide predetermined air/fuel mixtures in the cylinders and/ or to achieve a predetermined torque output from the ICE. Increasing the amount of air and/or fuel to the cylinders, increases the torque output of the ICE.

During certain situations, one or more of the cylinders of the ICE may be deactivated, for example, to conserve fuel. Deactivation of a cylinder may include deactivating intake and/or exhaust valves of the cylinder and halting injection of fuel into the cylinder. One or more cylinders may be deactivated, for example, when the remaining cylinders that are active are capable of producing a requested amount of output torque.

SUMMARY

A system is provided and includes a parameter module that determines at least one of a position of a throttle and a load of an engine. A cylinder status module generates a status signal indicating an activation status of each cylinder of the engine. The cylinder status module determines whether one or more of the cylinders are activated. A first pressure prediction module, when all of the cylinders are activated, predicts first intake port pressures for the cylinders of the engine according to a first model and based on the at least one of the position of the throttle and the engine load. A second pressure prediction module, when one or more of the cylinders is deactivated, predicts second intake port pressures for the deactivated cylinders according to a second model and based on the status signal and the at least one of the position of the throttle and the engine load.

In other features, a method is provided and includes determining at least one of a position of a throttle and a load of an engine. A status signal is generated and indicates an activation status of each cylinder of the engine. The method further includes determining whether one or more of the cylinders is deactivated. When all of the cylinders are activated, first intake port pressures are predicted for the cylinders according to a first model and based on the at least one of the position of the throttle and the engine load. When one or more of the cylinders is deactivated, second intake port pressures are predicted for the deactivated cylinders according to a second model and based on the status signal and the at least one of the position of the throttle and the engine load.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
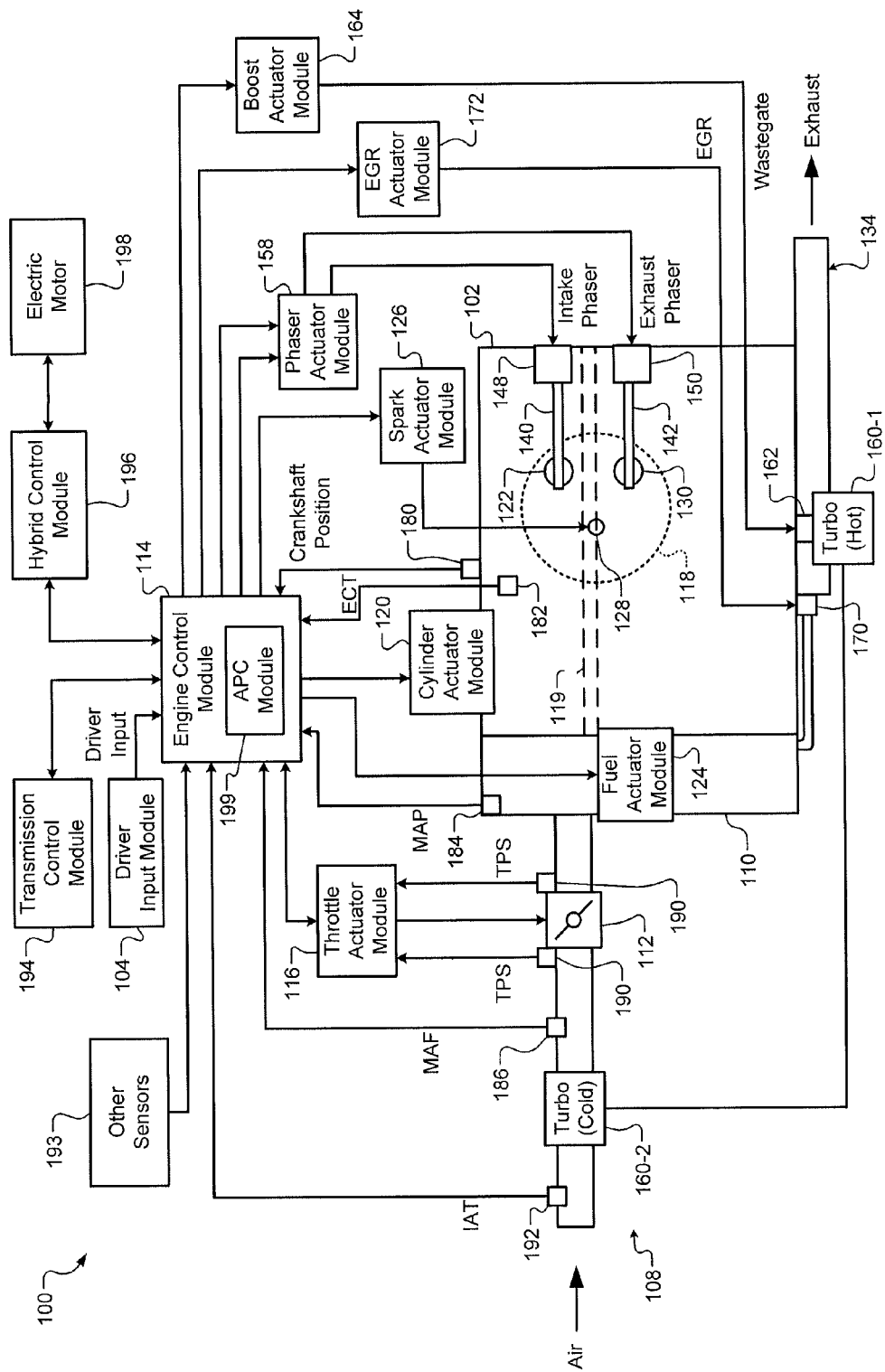
FIG. 1 is a functional block diagram of an engine system incorporating an air per cylinder module in accordance with the present disclosure.

An air meter (e.g., mass air flow sensor) may be used to measure air entering an intake manifold of an engine. The air meter may be located upstream from the engine and may be sampled prior to each cylinder intake event. There is a uniform number of cranking degrees between cylinder intake events when all cylinders of an engine are activated. As an example, for an eight cylinder engine with all eight cylinders activated, each cylinder intake event may occur after each 90° rotation of a crankshaft of the engine. An intake valve is opened during a cylinder intake event to draw air into the corresponding cylinder. A crankshaft of an engine may rotate twice (720°) for a single engine cycle. Each engine cycle includes a cylinder intake event for each cylinder of the engine. As another example, for a six cylinder engine with all six cylinders activated each cylinder intake event may occur after each 120° rotation of a crankshaft of the engine. As yet another example, for a four cylinder engine with all four cylinders activated each cylinder intake event may occur after each 180° rotation of a crankshaft of the engine.

For air and fuel management (AFM) engines that perform cylinder activation and deactivation, the number of activated cylinders of an engine at a certain moment in time may be less than the total number of cylinders. As a result, there is a non-uniform number of cranking degrees between cylinder intake events. For example, a six cylinder engine operating with four activated cylinders may have a non-uniform pattern of the number of cranking degrees per cylinder intake event (e.g., 120°, 120°, 240°, 120°, 120°, 240°). An engine may deactivate and reactivate any number of cylinders in various patterns and/or at random. The number of cylinders activated and deactivated, an ignition order of the cylinders, and a selected cylinder identified for ignition may be random and/or determined based on, for example, engine load.

An engine system that is capable of operating on any number of cylinders and is capable of selecting which one or more cylinders of the engine to be activated at any moment in time may be referred to as a full authority (FA) AFM engine system. FA AFM engine systems can have complex patterns of cranking degrees per cylinder intake event. The non-uniform patterns of cranking degree per cylinder intake event and random activation of cylinders introduces a degree of freedom with respect to intake pressure dynamics of an intake manifold of the engine. In other words, intake pressure geometric distribution and port pressures of the intake manifold can change with cylinder activation, deactivation, and ignition pattern changes.

Air mass within a cylinder (or air charge of a cylinder) can be estimated and/or predicted based on a manifold absolute pressure (MAP) detected via a MAP sensor. The estimated and/or predicted air mass values can be inaccurate and/or have errors due to changes in the intake pressure geometric distribution.

A technique that may be used to predict cylinder air mass given the predicted intake port pressure is referred to as a speed density technique, which includes use of the Ideal Gas Law, as represented by equation 1, where P is pressure of air entering the intake port, V is a volume of air in and/or entering a cylinder, n is moles (which is based on an air mass in and/or entering the cylinder), R is the ideal or universal gas constant and is equal to the product of Boltzmann's constant and Avogadro's constant, and T is temperature of the intake port and/or air in the intake port.

$$PV = nRT \quad (1)$$

The air mass associated with the number of moles n may be estimated and/or predicted based on an estimate and/or prediction of the pressure P. The pressure P may be determined using a pressure model, as represented by sample equation 2, where $P_{INT}$ is the pressure of the intake manifold and/or intake port, and k is a time event. The pressure P of equation 1 may be replaced with pressure $P_{INT}$ of equation 2. The variables i and j are integers, which indicate a certain time event from the $k^{th}$ time event. In equation 2, the variables n and m are each a number of predetermined task values, which may be set based on a selected amount of historical values, equation complexity, and/or processing time. One method that may be used to predict the intake port pressure is to fit an auto-regressive-moving-average (ARMA) model (such as equation 2). The variables α and β are predetermined values selected using regressive techniques to provide a curve fit for equation 2 based on collected test data with minimal error. The variables α and β are selected to provide an estimate and/or prediction of the pressure $P_{INT}$ for time event k+1 with minimal error.

$$P_{INT}(k+1)_{AllAct} = \sum_{i=0}^{n} \alpha_i \cdot P_{INT}(k-i)_{AllAct} + \sum_{j=0}^{m} \beta_j \cdot THR(k-j) \quad (2)$$

The variables $\alpha_{0-n}$ are unit less. The variables $\beta_{0-m}$ have a units of measure of pressure over position, such that the units of measure for each the first and second summations of equation 2 are pressure.

Predicting an intake port pressure of a next active cylinder using a speed density approach can be difficult when the cylinders are rapidly activated and deactivated such as in a FA AFM engine system. The intake port pressures depend on how a load of an engine is changing and whether the cylinders of the engine were previously activated or deactivated.

The implementations disclosed herein include using one or more models to predict intake manifold pressure geometric distributions such that air mass charge prediction for each activated cylinder of a FA AFM engine is accurate. This accuracy is provided while one or more cylinders of the FA AFM engine are deactivated.

In FIG. 1, an engine system 100 is shown. The engine system 100 of a vehicle includes a FA AFM engine 102 (hereinafter the engine 102) that combusts an air/fuel mixture to produce torque based on driver input from a driver input module 104. Air is drawn into the engine 102 through an intake system 108. The intake system 108 may include an intake manifold 110 and a throttle valve 112. An engine control module (ECM) 114 controls a throttle actuator module 116 to regulate opening of the throttle valve 112 and to control airflow into the intake manifold 110.

Air from the intake manifold 110 is drawn into cylinders of the engine 102. While the engine 102 may include any number of cylinders, a single representative cylinder 118 is shown for illustration purposes. The ECM 114 may instruct a cylinder actuator module 120 to selectively deactivate one or more of the cylinders.

The engine 102 may operate using a four-stroke cylinder cycle. The four strokes include an intake stroke, a compression stroke, a combustion stroke, and an exhaust stroke. During each revolution of a crankshaft 119, each of the cylinders experiences two of the four strokes. Therefore, two crankshaft revolutions are necessary for each of the cylinders to experience all four of the strokes.

During the intake stroke, air from the intake manifold 110 is drawn into the cylinder 118 from an intake port of the intake manifold 110 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which is referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may halt provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time at which the piston returns to a bottom most position, which is referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by deactivating opening of the intake valve 122 and/or the exhaust valve 130. The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158. In various other implementations, the intake valve 122 and/or the exhaust valve 130 may be controlled by actuators other than camshafts, such as electromechanical actuators, electrohydraulic actuators, electromagnetic actuators, etc.

The engine system 100 may include a boost device that provides pressurized air to the intake manifold 110. For example, FIG. 1 shows a turbocharger including a turbine 160-1 that is driven by exhaust gases flowing through the exhaust system 134. The turbocharger also includes a compressor 160-2 that is driven by the turbine 160-1 and that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. Although shown separated for purposes of illustration, the turbine 160-1 and the compressor 160-2 may be mechanically linked to each other, placing intake air in close proximity to hot exhaust. The compressed air charge may absorb heat from components of the exhaust system 134.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

Crankshaft position may be measured using a crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. The engine system 100 may also include one or more other sensors 193. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The engine 102 outputs torque to the transmission via the crankshaft 119.

The ECM 114 may communicate with a hybrid control module 196 to coordinate operation of the engine 102 and one or more electric motors 198. The electric motor 198 may also function as a generator, and may be used to produce electrical energy for use by vehicle electrical systems and/or for storage in a battery.

Each system that varies an engine parameter may be referred to as an engine actuator. Each engine actuator receives an actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the boost actuator module 164, and the EGR actuator module 172. For these engine actuators, the actuator values may correspond to a cylinder activation/deactivation sequence, fueling rate, intake and exhaust cam phaser angles, boost pressure, and EGR valve opening area, respectively.

The ECM 114 may generate the actuator values in order to cause the engine 102 to generate a desired engine output torque.

The ECM 114 and/or one or more other modules of the engine system 100 may implement a cylinder activation/deactivation system of the present disclosure. For example, the ECM 114 selects a next cylinder deactivation pattern based on one or more factors, including, but not limited to, engine speed, requested torque, a selected gear, air-per-cylinder (APC, e.g., an estimate or calculation of the mass of air in each cylinder), residual exhaust per cylinder (RPC, e.g., a mass of residual exhaust gas in each cylinder), and respective cylinder identifications (IDs).

The ECM 114 may include an APC module 199. The APC module 199 determines air mass values of air received by the intake manifold 110 and estimates and predicts air mass values of air to be received by each of the cylinders of the engine 102. An example of the ECM 114 and the APC module 199 are shown in FIGS. 2-3.

Figure 2:
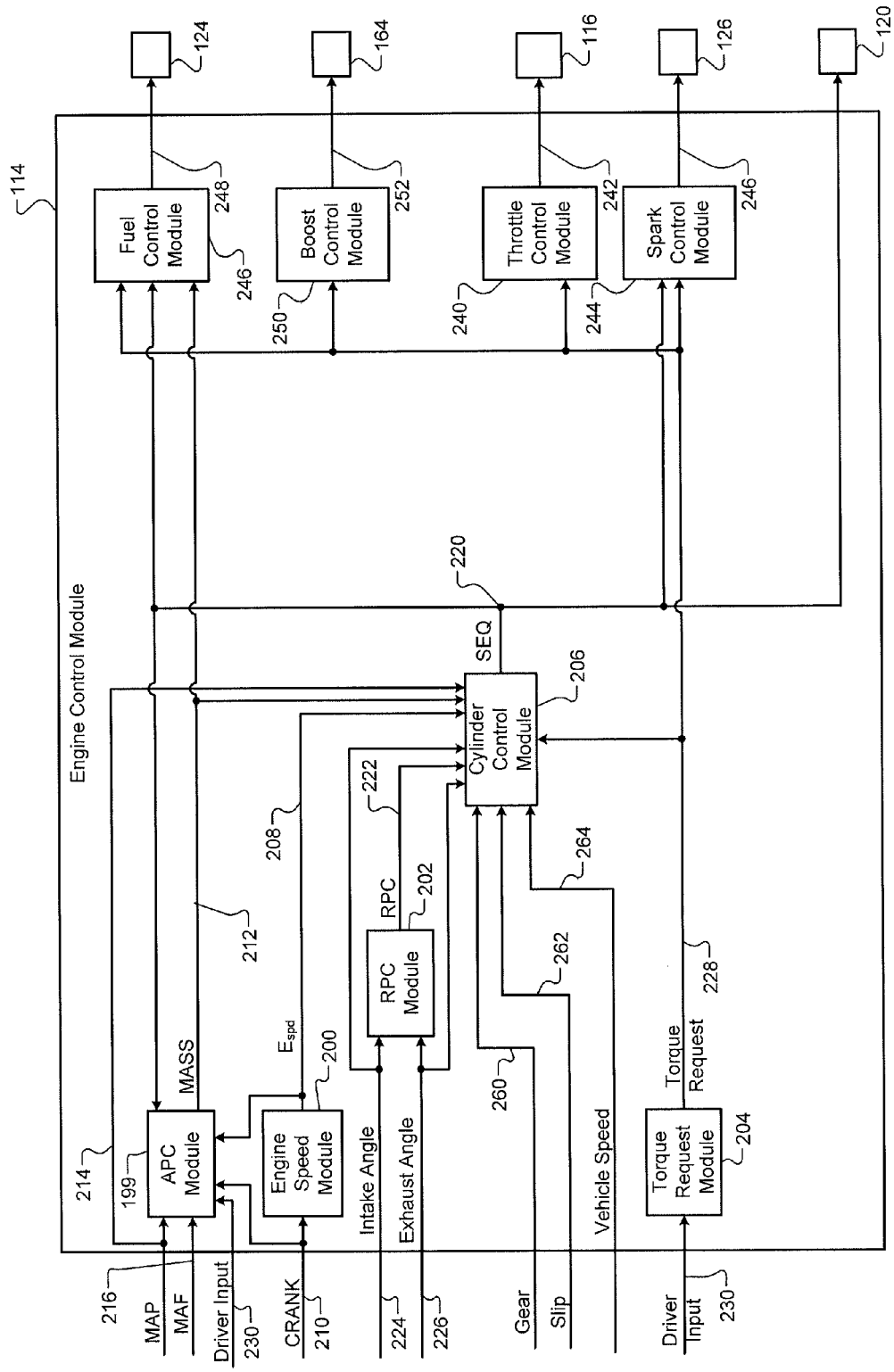
FIG. 2 is a functional block diagram of an example engine control module incorporating the air per cylinder module in accordance with the present disclosure.
Figure 3:
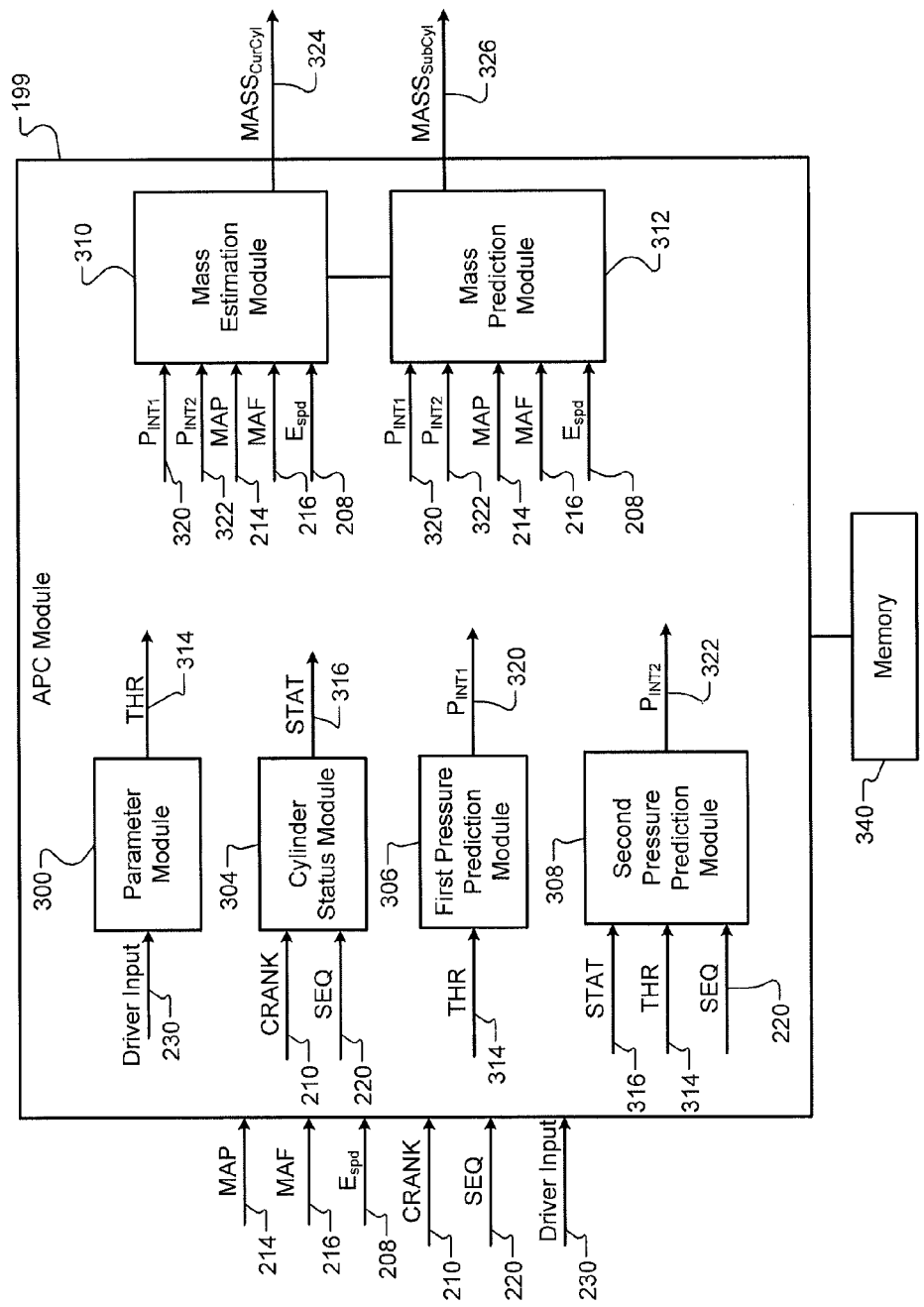
FIG. 3 is a functional block diagram of the air-per-cylinder module of FIGS. 1 and 2.

Referring now also to FIG. 2, a functional block diagram of the ECM 114 is shown. The ECM 114 includes an engine speed module 200, the APC module 199, a RPC module 202, a torque request module 204, and a cylinder control module 206. The engine speed module 200 determines a speed $E_{spd}$ 208 of the engine 102 based on a crankshaft position signal CRANK 210 received from the crankshaft position sensor 180.

The APC module 199 estimates an air mass for a current cylinder $MASS_{CurCyl}$ and predicts an air mass for a subsequent cylinder $MASS_{SubCyl}$ (collectively signal MASS 212) based on signals $E_{spd}$ 208, CRANK 210, MAP 214, MAF 216, and driver input 230 (e.g., throttle position THR) received from the engine speed module 200, the crank position sensor 180, the MAP sensor 184, the MAF sensor 186 and the driver input module 104. The current cylinder $MASS_{CurCyl}$ and the air mass for a subsequent cylinder $MASS_{SubCyl}$ may also be determined based on an activation/deactivation sequence SEQ 220, as determined by the cylinder control module 206.

The RPC module 202 determines RPC values 222. Although the RPC module 202 is shown as receiving intake and exhaust angle signals 224, 226, the RPC module 202 may determine the RPC values 222 based on the intake and exhaust angle signals 224, 226, an EGR valve position, a MAP, and/or an engine speed.

The torque request module 204 may determine a torque request 228 based on one or more driver inputs 230, such as an accelerator pedal position, a brake pedal position, a cruise control input, and/or one or more other suitable driver inputs. The torque request module 204 may determine the torque request 228 based on one or more other torque requests, such as torque requests generated by the ECM 114 and/or torque requests received from other modules, such as the transmission control module 194, the hybrid control module 196, a chassis control module, etc.

One or more engine actuators may be controlled based on the torque request 228 and/or one or more other torque requests. For example, a throttle control module 240 may determine a throttle opening signal 242 based on the torque request 228. The throttle actuator module 116 may adjust opening of the throttle valve 112 based on the throttle opening signal 242. A spark control module 244 may generate a spark timing signal 246 based on the activation/deactivation sequence SEQ 220 and the torque request 228. The spark actuator module 126 may generate spark based on the spark timing signal 246.

A fuel control module 246 may determine one or more fueling parameters 248 based on the signal MASS 212, the torque request 228, and the activation/deactivation sequence SEQ 220. For example, the fueling parameters 248 may include a fuel injection amount, number of fuel injections for injecting the fuel injecting amount per cylinder cycle, and timing for each of the injections. The fuel actuator module 124 may inject fuel based on the fueling parameters 248. A boost control module 250 may determine a boost level 252 based on the driver torque request 228. The boost actuator module 164 may control boost output by the boost device(s) based on the boost level 252.

The cylinder control module 206 selects the activation/deactivation sequence SEQ 220 based on the torque request 228. The cylinder actuator module 120 activates and deactivates the intake and exhaust valves of the cylinders according to the selected activation/deactivation sequence SEQ 220. The cylinder control module 206 may select the activation/deactivation sequence SEQ 220 based on, for example, the signals 208, 212, 214, 222, 224, 226, 228 and a selected transmission gear, slip and/or vehicle speed. Gear, slip and vehicle speed signals 260, 262, 264 are shown.

Fueling is halted (zero fueling) to cylinders that are to be deactivated according to the activation/deactivation sequence SEQ 220. Fuel is provided to the cylinders that are to be activated according to the activation/deactivation sequence SEQ 220. Spark is provided to the cylinders that are to be activated according to the activation/deactivation sequence SEQ 220. Spark may be provided or halted to cylinders that are to be deactivated according to the activation/deactivation sequence SEQ 220. Cylinder deactivation is different than fuel cutoff (e.g., deceleration fuel cutoff) in that the intake and exhaust valves of cylinders to which fueling is halted are still opened and closed during the fuel cutoff, whereas for cylinder deactivation the intake valves and/or exhaust valves are deactivated (or maintained in a closed state).

In FIG. 3, the APC module 199 includes a parameter module 300, a cylinder status module 304, a first pressure prediction module 306, a second pressure prediction module 308, a mass estimation module 310, and a mass prediction module 312. The modules 300-312 are now described with respect to the method of FIG. 4.

Figure 4:
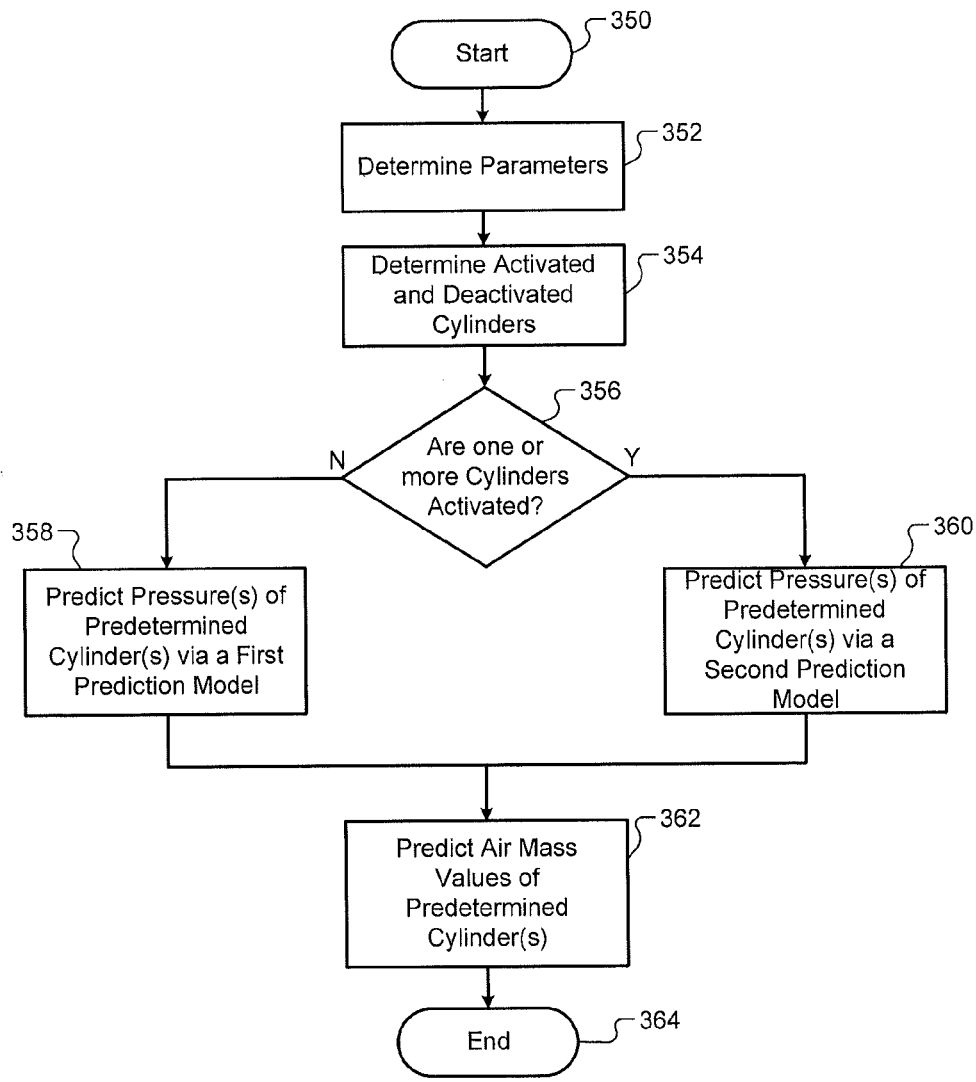
FIG. 4 illustrates a method of operating the engine system of FIG. 1 and the air-per-cylinder module of FIGS. 1-3 in accordance with the present disclosure.

The engine system 100 and the APC module 199 may be operated using numerous methods, an example method is provided in FIG. 4. In FIG. 4, a method of operating the engine system 100 and the APC module 199 is shown. The method may include one or more algorithms, equations, and/or models. Although the following tasks are primarily described with respect to the implementations of FIGS. 1-3, the tasks may be easily modified to apply to other implementations of the present disclosure. The tasks may be iteratively performed. The method may begin at 350. This may occur, for example, at a startup of the engine 102 and/or during operation of the engine 102.

At 352, the parameter module 300 determines one or more parameters, such as throttle position THR 314 and/or engine load. The throttle position THR 314 may be used to represent and/or be an estimate of engine load. The throttle position may be determined based on the driver input 230. Although in the following tasks are primarily describe using throttle positions, the tasks may be implemented using engine load. Engine load may be used in addition to and/or as an alternative of throttle position.

At 354, the cylinder status module 304 determines status of one or more of the cylinders. This includes determining whether the cylinders are activated or deactivated. The cylinder status may be determined for a predetermined number of time events including a current time event (e.g., $k^{th}$ time event), and time events prior to and/or subsequent to the current time event. The cylinder status module 304 generates a status signal STAT 316 indicating the activated and deactivated statues of the cylinders. The status signal STAT 316 may be generated based on the crankshaft position signal CRANK 210 and the activation/deactivation sequence SEQ 220.

At 356, the cylinder status module 304 determines whether one or more of the cylinders are currently activated for the current time event and/or are to be activated in one or more subsequent time events. Intake manifold pressures and intake port pressures may be predicted for one or more time events subsequent to the current time event. Each time event may refer to a time (i) between two consecutive cylinder intake or non-intake events, (ii) between two intake strokes of two consecutive cylinders, and/or (iii) between time periods when intake valves of two consecutive cylinders are opened. The predicted pressures are determined during tasks 358 and 360 using one or more selected models. Each of tasks 358 and 360 has one or more associated models. One or more of the models used at 360 may be referred to as auto-regressive-moving-average (ARMA) models.

Task 358 may be performed when all of the cylinders $N_{Cyl}$ of the engine 102 are activated (referred to as a nominal condition) for a current time event and/or for a subsequent time event. Task 358 may also be performed when the rate at which cylinders are transitioned between activated and deactivated states is less than a predetermined rate and/or when the cylinders are not being transitioned between activated and deactivated states. Task 360 may be performed when one or more of the cylinders are deactivated for a current time event and/or for a subsequent time event. Task 360 may also be performed when the rate at which cylinders are transitioned between activated and deactivated states is greater than or equal to the predetermined rate.

At 358, the first pressure prediction module 306 predicts (i) intake manifold pressures, and/or (ii) intake port pressures for one or more cylinders using a first model to predict each of the pressures. The first model may be represented by above provided equation 2. The first model may alternatively be represented by equation 3. In one implementation, $P_{INT}(k+1)_{AllAct}$ is the intake port pressure for a next activated cylinder at time event k+1 and prior to a cylinder intake event and/or a cylinder ignition (spark) event, $P_{INT}(k)_{AllAct}$ is the intake port pressure for the most recent activated cylinder that is at time event k and prior to a current cylinder intake event and/or current cylinder ignition event, and $P_{INT}(k-1)_{AllAct}$ is the intake port pressure for a previous activated cylinder at a time event k−i and prior to a previous cylinder intake event and/or cylinder ignition event.

$$P_{INT}(k+1)_{AllAct} = \alpha_0 P_{INT}(k)_{AllAct} + \alpha_1 P_{INT}(k-1)_{AllAct} + \ldots + \alpha_n P_{INT}(k-n)_{AllAct} + \beta_0 THR(k) + \beta_1 THR(k-1) + \beta_m THR(k-m) \quad (3)$$

The variables $\alpha_{0-n}$ and $\beta_{0-m}$ are predetermined values selected using regressive techniques to provide a curve fit for one or more of equations 2-3 based on collected test data and with minimal error. The variables $\alpha_{0-n}$ and $\beta_{0-n}$ are selected to provide an estimate and/or prediction of the pressures $P_{INT}(k+1)_{AllAct}$ with minimal error and may be selected based on engine speed $E_{spd}$, intake and exhaust cam phaser positions, intake port temperatures of the cylinders, intake manifold temperatures, MAPs, MAFs, etc. In one implementation, the term $P_{INT}(k)_{AllAct}$ may be determined by direct measurement using intake port pressure sensors, which may be mounted on the intake manifold 110. In another implementation, the term $P_{INT}(k)_{AllAct}$ may be determined indirectly based on the engine speed signal $E_{spd}$ and a model of current and past manifold pressures detected via the MAP sensor 184. The pressures determined at 358 are represented by signal $P_{INT1}$ 320 in FIG. 3 and are determined based on the throttle signal THR 314.

At 360, the second pressure prediction module 308 predicts (i) intake manifold pressures, and/or (ii) intake port pressures for one or more cylinders using a second model to predict each of the pressures. The pressures determined at 360 are represented by signal $P_{INT2}$ 322 in FIG. 3 and are determined based on the activation/deactivation signal SEQ 220, the throttle signal THR 314, and the status signal STAT 316.

The second model may be represented by one or more of equations 4-7, where variable $\gamma_l$ of equation 4 and variable $\gamma$ of equations 5-7 are predetermined values selected using regressive techniques to provide a curve fit for one or more of equations 4-7 based on collected test data with minimal error. The variables $\gamma_l$ and $\gamma$ of equations 4-7 may be selected based on engine speed $E_{spd}$, intake and exhaust cam phaser positions, intake port temperatures of the cylinders, intake manifold temperatures, MAPs, MAFs, etc.

The variable $X_{Cyl}$ is a 1 if the cylinder is activated and a 0 if the cylinder is deactivated. The variable $N_{Cyl}$ is the number of cylinders. The variable l is a predetermined integer greater than or equal to 0. The variables $\gamma_{0-N_{Cyl}}$ of equation 4 and the variable $\gamma$ of equations 5-7 have units of measure of pressure, such that the units of measure for a third summation of equation 2 is pressure. The variable e is a base for which the natural logarithm of the value $e^{\gamma_l}$ is equal $\gamma_l$ (i.e. $\ln(e^{\gamma_l})=\gamma_l$). The variables $\gamma_{0-N_{Cyl}}$ of equation 4 and the variable $\gamma$ of equations 5-7 are selected to provide an estimate and/or prediction of the pressures $P_{INT}(k+1)_{SomeAct}$ with minimal error. The variable $X_{Array}$ of equation 7 refers to an engine cycle for a particular time event. Each term of $X_{Array}$ in equation 7 may include an array of activation and deactivation status values for the cylinders and for a particular time event.

$$P_{INT}(k+1)_{SomeAct} = \left[\sum_{i=0}^{n}\alpha_i \cdot P_{INT}(k-i)_{SomeAct} + \sum_{j=0}^{m}\beta_j \cdot THR(k-j)\right] \cdot \left[\sum_{l=0}^{N_{Cyl}} e^{\gamma_l} \cdot X_{Cyl}(k-l)\right] \quad (4)$$

$$P_{INT}(k+1)_{SomeAct} = P_{INT}(k+1)_{AllAct} \cdot \gamma \cdot F\{Pat(k+1), Pat(k), \ldots, Pat(k-l)\} \quad (5)$$

$$P_{INT}(k+1)_{SomeAct} = P_{INT}(k+1)_{AllAct} \cdot \gamma \cdot F\left\{\begin{bmatrix} C_{11} & C_{21} & C_{31} & C_{41} & C_{51} & C_{61} \\ C_{12} & C_{22} & C_{32} & C_{42} & C_{52} & C_{62} \\ \vdots & \vdots & \vdots & \vdots & \vdots & \vdots \\ C_{1x} & C_{2x} & C_{3x} & C_{4x} & C_{5x} & C_{6x} \end{bmatrix}, Par_{Other}\right\} \quad (6)$$

$$P_{INT}(k+1) = [\alpha_0 P_{INT}(k) + \alpha_1 P_{INT}(k-1) + \ldots + \alpha_n P_{INT}(k-n) + \beta_0 THR(k) + \beta_1 THR(k-1) + \beta_m THR(k-m)] \cdot [\gamma \cdot F\{X_{Array}(k), X_{Array}(k-1), \ldots, X_{Array}(k-l)\}] \quad (7)$$

Equation 4 is similar to equation 2, however a third summation is included to account for deactivated cylinders and a decay rate in predicted pressures for consecutive activated cylinders cycled subsequent to a deactivated cylinder. A first activated cylinder after a deactivated cylinder receives more air than subsequent activated cylinders, due to a buildup of an air mass in the intake manifold 110 during a cylinder event of the deactivated cylinder.

Equations 5 and 6 include the term $P_{INT}(k+1)_{SomeAct}$, which is equal to the term $P_{INT}(k+1)_{AllAct}$ from one of equation 2-3 multiplied by a corrective factor (or correction function) and the variable γ In equation 5, Pat(k+1) refers to an activation/deactivation sequence for a subsequent engine cycle of a subsequent time event k+1, Pat(k) refers to an activation/deactivation sequence for a current engine cycle of a current time event k, and Pat(k−1) refers to an activation/deactivation sequence for a previous engine cycle of a previous time event k−1. Each activation/deactivation sequence indicates the activation/deactivation status of each of the cylinders of the engine 102 and may be represented as an array of values or as, for example, a row of a matrix.

The corrective function of equation 6 includes a matrix and may also include one or more other parameters $Par_{Other}$. Examples of activation/deactivation status values for each cylinder and for l engine cycles are represented as elements in the matrix of equation 6. Each row of the matrix represents the status values of the cylinders for a single engine cycle. Each entry of the matrix is a cylinder status value. The first subscript value for each entry indicates a number of a corresponding cylinder. The second subscript value of each entry indicates a corresponding cylinder event. As example, the matrix entry $C_{21}$ is the status value for cylinder 2 and engine cycle 1.

The other parameters $Par_{Other}$ may include intake and camshaft cam phaser position values, intake port temperatures, a number of cylinders to be deactivated, and/or which cylinders to be deactivated. In one implementation, the function of equation 6 does not include the other parameters $Par_{Other}$. In another implementation, the function of equation 6 does not include the matrix.

In equation 7, $X_{Array}(k)$ is an array of cylinder status values (e.g., $[C_1, C_2, \ldots, C_{Ncyl}]$) for the cylinders of the engine 102 at the time event k. In one implementation, the array includes a signal status value for each of the cylinders indicating whether the cylinders have been activated or deactivated over the number of cylinder events for the last engine cycle. In another implementation, the array includes a signal status value for each of the cylinders indicating whether the cylinders are currently activated or deactivated for a current cylinder cycles of a current engine cycle. In yet another implementation, $X_{Array}(k)$ is equal to a transpose of the array of cylinder events, as represented by equation 8, where $[C_1, C_2, \ldots, C_{Ncyl}]$ is an array of the cylinder status values for the cylinders of the engine 102 and T indicates the transpose of the array $[C_1, C_2, \ldots, C_{Ncyl}]$.

$$X_{Array}=[C_1,C_2,\ldots,C_{Ncyl}]^T \quad (8)$$

At 362, the mass prediction module 312 may predict air mass values (or air masses) for the intake manifold 110 and/or the cylinders of the engine 102. The air mass values may be predicted using the Ideal Gas Law as described above and based on the predicted pressures $P_{INT1}$ determined during task 358 and/or the predicted pressures predicted pressures $P_{INT2}$ determined during task 360. The predicted air masses may also be determined based on the signals MAP 214, MAF 216, and $E_{spd}$ and/or previous or current estimated air mass values. The mass estimation module 310 may estimate current air mass values and track previous air mass values. The mass estimation module 310 may generate an air mass signal $MASS_{CurCyl}$ 324 indicating the previous and current air mass estimations. The mass prediction module 312 may generate an air mass signal $MASS_{SubCyl}$ 326 indicating the predicted air mass values. The method may end at 364 as shown, or may return to 352.

The above-described signals, values, masses, models, and parameters may be stored in a memory 340 and accessed by any of the modules of the ECM 114 and/or the APC module 199. The above-described method may be used to estimate or predict an amount of air mass in each cylinder of the engine 102 while the engine system 100 is not operating at steady-state, as determined by the APC module 199 and/or the ECM 114. The engine 102 is operating at steady-state when air flow into an intake manifold 110 of the engine 102 is constant and/or within a predetermined range of a predetermined amount of air flow. Change in air flow may be due to, for example, a change in the throttle position and/or changes in positions of the cam phasers 148, 150.

The above-described method and/or the signal MAP 214 may be used to estimate and/or predict air masses when the engine system 100 is operating at steady-state and/or not at steady-state. The APC module 199 may determine whether the engine system 100 is operating at steady-state based on (i) change in position of the throttle or the signal THR 314, (ii) the engine load, (iii) change in positioning of the cam phasers. Subsequent to determining whether the engine system is operating at steady-state, the APC module 199 may estimate and/or predict air masses based on the signal MAP 214 and/or using the method of FIG. 4 based on the steady-state determination. In one implementation, the air masses may be estimated and/or predicted based on the signal MAP 214 and/or using the method of FIG. 4 when at steady-state and may not be estimated and/or predicted when not at steady-state. In another implementation, the air masses are estimated and/or predicted regardless of whether the engine system 100 is operating at steady-state. The above estimated and/or predicted air mass values may be used by the modules 240, 244, 246, 250, as described above.

In general, volumetric efficiency (Ve) of the engine 102 may be determined via tests when the engine system 100 is operating at steady-state and may not be determined when the engine system 100 is not operating at steady-state. On the other hand, the speed density method of FIG. 4 may be used regardless of whether the engine system 100 is operating at steady-state.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A system comprising:
a parameter module that determines at least one of a position of a throttle and a load of an engine, wherein the engine comprises a plurality of cylinders;
a cylinder status module that generates a status signal indicating an activation status for each of the plurality of cylinders, wherein the cylinder status module determines whether one or more of the plurality of cylinders are deactivated;
a first pressure prediction module that, when all of the plurality of cylinders are activated, predicts first intake port pressures for the plurality of cylinders according to a first model and based on the at least one of the position of the throttle and the load of the engine;
a second pressure prediction module that, when one or more of the plurality of cylinders is deactivated, predicts second intake port pressures for the deactivated cylinders according to a second model and based on the status signal and the at least one of the position of the throttle and the load of the engine; and
a fuel control module configured to adjust fuel to or torque output of the engine based on the first intake port pressure and the second intake port pressure.

2. The system of claim 1, wherein the second model includes the first model and a summation that accounts for:
the deactivated cylinders; and
a decay rate of air mass values of consecutive activated cylinders having cylinders cycles subsequent to one of the deactivated cylinders.

3. The system of claim 1, wherein:
the first model comprises
a first summation that sums predicted intake port pressures for a first plurality of time events of one of the plurality of cylinders, and
a second summation that sums pressure values based on the position of the throttle for a second plurality of time events; and
the second model comprises
the first summation,
the second summation, and
a third summation of pressure values based on the status signal.

4. The system of claim 3, wherein the first plurality of time events include the second plurality of time events.

5. The system of claim 3, wherein the first plurality of time events include time events not included in the second plurality of time events.

6. The system of claim 1, wherein the second pressure prediction module predicts the second intake port pressures based on an activation and deactivation sequence of the plurality of cylinders.

7. The system of claim 1, wherein:
the first pressure prediction module, when all of the plurality of cylinders are to be activated for a time event of a first predicted intake port pressure, predicts the first predicted intake port pressure according to the first model; and
the second pressure prediction module, when one or more of the plurality of cylinders are to be deactivated for a time event of a second predicted intake port pressure, predicts the second predicted intake port pressure according to the second model.

8. The system of claim 1, wherein:
the first model and the second model include a pressure term for a time event of a current cylinder; and
at least one of the first pressure prediction module and the second pressure prediction module determines the pressure term indirectly based on a speed of the engine and a model of a current pressure and past pressures of a manifold of the engine.

9. The system of claim 1, wherein:
the first model includes a pressure term for a time event subsequent to a time event of a current cylinder; and
the second model includes multiplying the pressure term by a function of a matrix of activation and deactivation sequences of the plurality of cylinders.

10. The system of claim 1, further comprising a mass prediction module that:
when all of the plurality of cylinders are activated, predicts first air mass values for the plurality of cylinders based on the first intake port pressures;
when one or more of the plurality of cylinders are deactivated, predicts second air mass values for the plurality of cylinders based on the second intake port pressures; and
the fuel control module is configured to adjust the fuel to or the torque output of the engine based on the first air mass value and the second air mass value.

11. A method comprising:
determining at least one of a position of a throttle and a load of an engine, wherein the engine comprises a plurality of cylinders;
generating a status signal indicating an activation status for each of the plurality of cylinders;
determining whether one or more of the plurality of cylinders are deactivated;
when all of the plurality of cylinders are activated, predicting first intake port pressures for the plurality of cylinders according to a first model and based on the at least one of the position of the throttle and the load of the engine;
when one or more of the plurality of cylinders is deactivated, predicting second intake port pressures for the deactivated cylinders according to a second model and based on the status signal and the at least one of the position of the throttle and the load of the engine; and adjusting fuel to or torque output of the engine based on the first intake port pressure and the second intake port pressure.

12. The method of claim 11, wherein the second model includes the first model and a summation that accounts for:
   the deactivated cylinders; and
   a decay rate of air mass values of consecutive activated cylinders having cylinders cycles subsequent to one of the deactivated cylinders.

13. The method of claim 11, wherein:
   the first model comprises
      a first summation that sums predicted intake port pressures for a first plurality of time events of one of the plurality of cylinders, and
      a second summation that sums pressure values based on the position of the throttle for a second plurality of time events;
   the second model comprises
      the first summation,
      the second summation, and
      a third summation of pressure values based on the status signal;
   the first plurality of time events include time events not included in the second plurality of time events; and
   the second plurality of time events include time events not included in the second plurality of time events.

14. The method of claim 11, further comprising predicting the second intake port pressures based on an activation and deactivation sequence of the plurality of cylinders.

15. The method of claim 11, further comprising:
   when all of the plurality of cylinders are to be activated for a time event of a first predicted intake port pressure, predicting the first predicted intake port pressure according to the first model; and
   when one or more of the plurality of cylinders are to be deactivated for a time event of a second predicted intake port pressure, predicting the second predicted intake port pressure according to the second model.

16. The method of claim 11, further comprising determining a pressure term indirectly based on a speed of the engine and a model of a current pressure and past pressures of a manifold of the engine,
   wherein the first model and the second model include the pressure term for a time event of a current cylinder.

17. The method of claim 11, wherein:
   the first model includes a pressure term for a time event subsequent to a time event of a current cylinder; and
   the second model includes multiplying the pressure term by a function of a matrix of activation and deactivation sequences of the plurality of cylinders.

18. The method of claim 11, further comprising:
   when all of the plurality of cylinders are activated, predicts first air mass values for the plurality of cylinders based on the first intake port pressures; and
   when one or more of the plurality of cylinders are deactivated, predicts second air mass values for the plurality of cylinders based on the second intake port pressures.

19. The system of claim 1, wherein the fuel control module is configured to adjust the fuel to and the torque output of the engine based on the first intake port pressure and the second intake port pressure.

20. The system of claim 10, wherein in the fuel control module is configured to adjust the fuel to and the torque output of the engine based on the first air mass value and the second air mass value.

* * * * *